United States Patent
Kwan

(10) Patent No.: US 10,650,368 B2
(45) Date of Patent: May 12, 2020

(54) PICK LIST OPTIMIZATION METHOD

(71) Applicant: NCR Corporation, Duluth, GA (US)

(72) Inventor: Sik Piu Kwan, Suwanee, GA (US)

(73) Assignee: NCR Corporation, Atlanta, GA (US)

( * ) Notice: Subject to any disclaimer, the term of this patent is extended or adjusted under 35 U.S.C. 154(b) by 256 days.

(21) Appl. No.: 15/407,059

(22) Filed: Jan. 16, 2017

(65) Prior Publication Data

US 2017/0206517 A1  Jul. 20, 2017

Related U.S. Application Data

(60) Provisional application No. 62/279,376, filed on Jan. 15, 2016.

(51) Int. Cl.
 - *G06Q 20/20* (2012.01)
 - *G06K 7/14* (2006.01)
 - *G06K 7/10* (2006.01)
 - *G07G 1/00* (2006.01)

(52) U.S. Cl.
CPC ....... *G06Q 20/208* (2013.01); *G06K 7/10831* (2013.01); *G06K 7/10861* (2013.01); *G06K 7/1439* (2013.01); *G06K 7/1473* (2013.01); *G07G 1/0063* (2013.01)

(58) Field of Classification Search
CPC ............... G06Q 20/208; G07G 1/0063; G06K 7/10831; G06K 7/10861; G06K 7/1439; G06K 7/1473
USPC .......................................................... 705/23
See application file for complete search history.

(56) References Cited

U.S. PATENT DOCUMENTS

| | | | | |
|---|---|---|---|---|
| 5,410,108 A | * | 4/1995 | Williams | G01G 19/4144 177/126 |
| 5,497,314 A | * | 3/1996 | Novak | A47F 9/046 705/17 |
| 5,546,475 A | * | 8/1996 | Bolle | G06K 9/4647 382/190 |
| 5,631,976 A | * | 5/1997 | Bolle | G06T 5/50 348/E5.038 |
| 5,649,070 A | * | 7/1997 | Connell | G06K 9/6271 706/14 |
| 6,005,959 A | * | 12/1999 | Mohan | G01B 11/024 348/89 |
| 6,219,438 B1 | * | 4/2001 | Giordano | G06K 7/10851 382/110 |
| 6,296,186 B1 | * | 10/2001 | Spencer | G06K 9/209 235/462.01 |

(Continued)

OTHER PUBLICATIONS https://stackoverflow.com/questions/20853527/hsi-and-hsv-color-space, Dec. 31, 2013 (Year: 2013).*

*Primary Examiner* — Ashford S Hayles
(74) *Attorney, Agent, or Firm* — Schwegman, Lundberg & Woessner

(57) ABSTRACT

A method of optimizing a pick list using image data from a barcode scanner. An example method includes comparing a reference background image captured by a scanner to an image of a produce item to be purchased, calculating attributes from the image, comparing the calculated attributes to reference produce attributes in a produce database, selecting reference produce attributes associated with reference produce items that are closest to the calculated attributes as the top candidates in the pick list.

17 Claims, 5 Drawing Sheets

(56) References Cited

U.S. PATENT DOCUMENTS

| | | | | |
|---|---|---|---|---|
| 6,310,964 | B1* | 10/2001 | Mohan | G01B 11/024 348/89 |
| 6,332,573 | B1* | 12/2001 | Gu | G06K 9/209 235/462.06 |
| 6,363,366 | B1* | 3/2002 | Henty | G01G 19/4144 382/110 |
| 6,412,694 | B1* | 7/2002 | Kumar | G06K 7/10861 235/462.01 |
| 6,424,745 | B1* | 7/2002 | Hansen | G06K 9/522 250/559.19 |
| 6,431,446 | B1* | 8/2002 | Gu | G01J 3/28 235/454 |
| 6,457,644 | B1* | 10/2002 | Collins, Jr. | G01G 19/4144 235/462.11 |
| 6,505,775 | B1* | 1/2003 | Gu | G01J 3/26 235/454 |
| 6,529,855 | B1* | 3/2003 | Gu | G06K 9/00536 382/190 |
| 6,530,521 | B1* | 3/2003 | Henry | G07G 1/0036 235/383 |
| 6,577,983 | B1* | 6/2003 | Zhu | G06K 9/00 702/128 |
| 7,100,824 | B2* | 9/2006 | Ostrowski | A47F 9/045 235/383 |
| 7,118,026 | B2* | 10/2006 | Harris | G06Q 20/20 235/375 |
| 7,290,707 | B2* | 11/2007 | Sawasaki | G06Q 10/087 235/385 |
| 7,340,079 | B2* | 3/2008 | Segawa | G06K 9/00288 382/118 |
| 8,170,322 | B2* | 5/2012 | Pine | G06K 9/2036 348/370 |
| 9,245,424 | B2* | 1/2016 | Ueda | G06K 9/00 |
| 9,505,554 | B1* | 11/2016 | Kong | H04N 5/23212 |
| 9,594,983 | B2* | 3/2017 | Alattar | G06F 21/16 |
| 2002/0037104 | A1* | 3/2002 | Myers | G06K 9/3258 382/187 |
| 2002/0107737 | A1* | 8/2002 | Kaneko | G06Q 30/02 705/14.68 |
| 2002/0138374 | A1* | 9/2002 | Jennings | G06K 9/00 705/29 |
| 2004/0019643 | A1* | 1/2004 | Zirnstein, Jr. | G06F 9/546 709/206 |
| 2006/0147087 | A1* | 7/2006 | Goncalves | G06K 9/3233 382/103 |
| 2006/0240862 | A1* | 10/2006 | Neven | G06K 9/228 455/550.1 |
| 2006/0261157 | A1* | 11/2006 | Ostrowski | A47F 11/10 235/383 |
| 2007/0133947 | A1* | 6/2007 | Armitage | G06F 16/5838 386/224 |
| 2007/0158417 | A1* | 7/2007 | Brewington | G06Q 30/06 235/383 |
| 2007/0203808 | A1* | 8/2007 | Sekimoto | G06Q 10/08 705/28 |
| 2008/0029596 | A1* | 2/2008 | Nygaard | G06K 17/00 235/383 |
| 2008/0149725 | A1* | 6/2008 | Rosenbaum | G06Q 20/20 235/462.41 |
| 2009/0026269 | A1* | 1/2009 | Connell, II | G06K 7/14 235/462.41 |
| 2009/0039164 | A1* | 2/2009 | Herwig | G07G 1/009 235/462.41 |
| 2009/0063307 | A1* | 3/2009 | Groenovelt | G06Q 10/087 705/28 |
| 2009/0097713 | A1* | 4/2009 | DeLean | G06F 21/32 382/115 |
| 2009/0194593 | A1* | 8/2009 | Kurihara | G07G 1/0054 235/462.41 |
| 2009/0226099 | A1* | 9/2009 | Kundu | G06Q 20/00 382/224 |
| 2009/0240735 | A1* | 9/2009 | Grandhi | G06Q 30/02 |
| 2009/0245573 | A1* | 10/2009 | Saptharishi | G06K 9/00771 382/103 |
| 2010/0002902 | A1* | 1/2010 | Landers, Jr. | G06Q 20/202 382/100 |
| 2010/0155476 | A1* | 6/2010 | Ross | G01N 21/3581 235/454 |
| 2010/0217678 | A1* | 8/2010 | Goncalves | G06Q 20/203 705/22 |
| 2010/0252635 | A1* | 10/2010 | Drzymala | G06K 7/10722 235/462.41 |
| 2011/0286628 | A1* | 11/2011 | Goncalves | G06F 16/5838 382/103 |
| 2012/0000976 | A1* | 1/2012 | Rollyson | G01G 19/4144 235/375 |
| 2012/0087547 | A1* | 4/2012 | He | G06K 9/629 382/110 |
| 2012/0145791 | A1* | 6/2012 | Gregerson | G06K 7/10702 235/470 |
| 2012/0145792 | A1* | 6/2012 | Barron | G06K 7/10881 235/470 |
| 2012/0223141 | A1* | 9/2012 | Good | G06K 7/10722 235/455 |
| 2012/0274777 | A1* | 11/2012 | Saptharishi | G06K 9/00771 348/159 |
| 2013/0223673 | A1* | 8/2013 | Davis | G06K 9/78 382/100 |
| 2013/0297433 | A1* | 11/2013 | Wakebe | G07G 1/0045 705/20 |
| 2014/0064569 | A1* | 3/2014 | Sugasawa | G06K 9/00671 382/110 |
| 2015/0012396 | A1* | 1/2015 | Puerini | G06Q 10/0875 705/28 |
| 2015/0054959 | A1* | 2/2015 | He | G06K 9/00523 348/150 |
| 2015/0310601 | A1* | 10/2015 | Rodriguez | G06K 9/209 348/150 |
| 2016/0037088 | A1* | 2/2016 | Kakino | G06K 9/2018 348/164 |
| 2016/0101936 | A1* | 4/2016 | Chamberlin | G05B 19/402 700/214 |
| 2016/0109281 | A1* | 4/2016 | Herring | G01G 19/4144 177/1 |
| 2016/0171473 | A1* | 6/2016 | Pugh | G06Q 20/208 705/23 |
| 2016/0275445 | A1* | 9/2016 | Rizzolo | G06Q 20/208 |
| 2017/0011378 | A1* | 1/2017 | Inoue | G06T 15/205 |
| 2017/0032304 | A1* | 2/2017 | Charpentier | G06Q 10/06316 |
| 2017/0178108 | A1* | 6/2017 | Tsuchimochi | G07G 1/01 |

\* cited by examiner

PICK LIST OPTIMIZATION METHOD

BACKGROUND

This present invention relates to displaying images of one or more candidate items to assist operators with identification of an item to be purchased during a transaction at a checkout station, and more specifically to a pick list optimization method.

Barcode readers are well known for their usefulness in retail checkout and inventory control. For example, an imaging barcode reader typically includes one or more cameras which capture images of an item, including a barcode on the item. The imaging barcode reader decodes the barcode to obtain information identifying the item.

In the case of items that don't easily lend themselves to being labeled with barcodes, retail checkout systems typically display lists of candidate items to assist an operator in making a proper identification of such items. The lists are often called "pick lists" and may include images of the items to aid identification. A common example of such an item is a produce item.

Even with a pick list of candidate items, some operators may still have trouble identifying produce items. There may be many candidate images that appear similar to the item to be purchased. Further, the candidate images may not be accurate enough.

Therefore, it would be desirable to optimize the pick list. It would be further desirable to optimize the pick list based upon information captured from the item to be purchased by a scanner.

SUMMARY

In accordance with the teachings of the present invention, a pick list optimization method is provided.

An example method includes comparing a reference background image captured by a scanner to an image of a produce item to be purchased, extracting a foreground image substantially containing only produce item, calculating attributes from the image, comparing the calculated attributes to reference produce attributes in a produce database, selecting reference produce attributes associated with reference produce items that are closest to the calculated attributes as top candidates in pick list.

An example method includes comparing a reference background image captured by a scanner to an image of a produce item to be purchased, extracting a foreground image substantially containing only produce item, applying a color correction to the extracted image to enhance its color accuracy and produce a color corrected image, calculating attributes from the color corrected image, comparing the calculated attributes to reference produce attributes in a produce database, selecting reference produce attributes associated with reference produce items that are closest to the calculated attributes as a top candidates in a pick list.

BRIEF DESCRIPTION OF THE DRAWINGS

The present invention may take form in various components and arrangement of components and in various methods. The drawings are only for purposes of illustrating example embodiments and alternatives and are not to be construed as limiting the invention.

DETAILED DESCRIPTION

Figure 1:
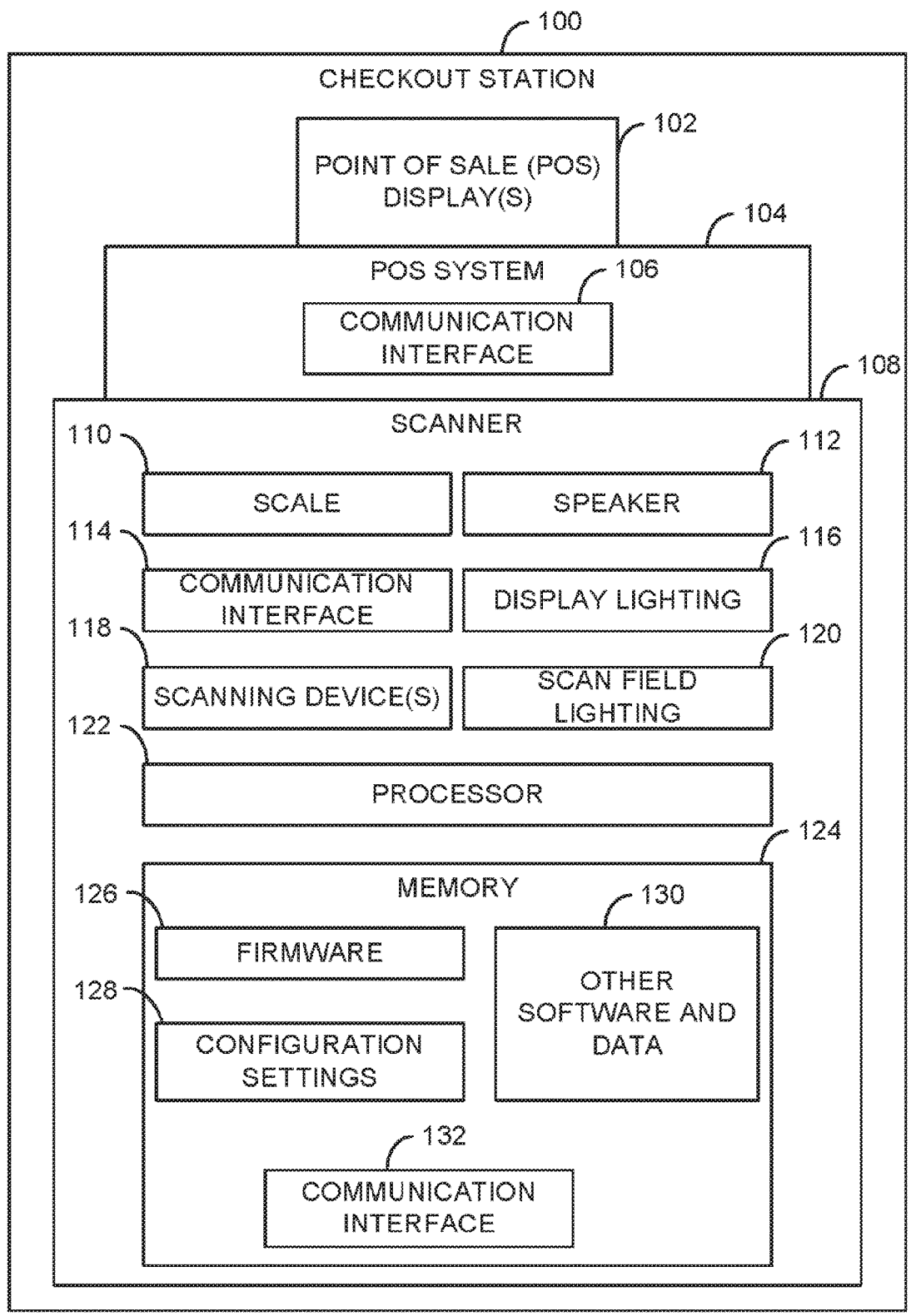
FIG. 1 is a block diagram of an example transaction system.

FIG. 1 illustrates components of an example checkout station 100. Checkout station 100 may include more or fewer components in some embodiments. Further, other arrangements with more or fewer components are possible without departing from the description of various embodiments herein. Thus, although checkout station 100 is illustrated to include a scanner 108, scanner 108 may be a standalone element or an element of other systems, devices, and terminals in other embodiments. Examples of other terminal-types that may include a scanner 108 are self-service terminals (SSTs), clerk operated and self-service library checkout stations, and the like.

The methods of some embodiments are programmed as executable instructions in memory and/or non-transitory computer-readable storage media and executed on one or more processors and other such data processing devices associated with the components and devices herein. Thus, in some embodiments, a non-transitory machine-readable storage device comprises instructions stored thereon, which, when performed by a machine, cause the machine to become a customized, particular machine that performs operations comprising one or more features similar to or identical to those described with respect to the methods and techniques described herein. A machine-readable storage device, herein, is a physical device that stores information (e.g., instructions, data), which when stored, alters the physical structure of the device. Examples of machine-readable storage devices can include, but are not limited to, memory in the form of read only memory (ROM), random access memory (RAM), a magnetic disk storage device, an optical storage device, a flash memory, and other electronic, magnetic, or optical memory devices, including combinations thereof.

The physical structure of stored instructions in memory 124 may be operated on by one or more processors such as, for example, processor 122. Operating on these physical structures can cause the machine to become a specialized machine that performs operations according to methods described herein.

Checkout station 100 includes one or more POS displays 102 that present information of a POS system 104 coupled to POS displays 102. Information presented by POS displays 102 includes information relevant in a retail context and with regard to operation of checkout station 100. One of POS displays 102 serves as an operator display for displaying transaction screens, including one or more transaction screens containing the pick list, including product images.

POS system 104 executes transaction software including transaction screens which guide an operator through a transaction. An example transaction is a transaction to purchase one or more produce items, alone or in combination with other items. During the transaction, POS system 104 generates one or more transaction screens containing a pick list of candidate items for identifying the produce items to be purchases.

Checkout station 100 also includes one or more scanners 108. Scanner 108 may be referred to as a barcode scanner as that is the task most commonly associated with such devices. An example of such a barcode scanner is the 7879 scanner. During operation of checkout station 100, items are placed within a scan field of scanner 108. One or more scanning devices 118 of scanner 108, such as one or more cameras then capture images of an item.

For items with barcodes, scanner 108 identifies and decodes the barcodes and information therefrom is communicated to POS system 104. POS system 104 then uses that data to identify the item placed within the scan field of scanner 108 and performs an additional function. The additional function may include a price lookup and addition of the item to a list of items to be purchased, which may be presented on POS displays 102.

For items without barcodes, such as produce items, scanner 108 provides the captured images to POS system 104, which uses the images to refine the list of candidate items in the pick list.

Scanner 108 may include one or more scan fields, such as two scan fields of bi-optic scanners that are in use in grocery and discount retail outlets, and well known to those of ordinary skill in the art. In addition to the scanning devices 118, scanner 108 may include various other components. The various other components may include an integrated scale 110 such as may be used in a grocery outlet to weigh produce items and one or both of a speaker 112 and display lighting 116 to output audio and visual signals such as signals indicating successful and/or unsuccessful scans. Scanner 108 may also include scan field lighting 120 that may be turned on and off and adjusted based on a detected presence of an item to be scanned.

During operation, scanner 108 is functions according to instructions executed on a processor 122. Processor 122 may comprise an application integrated circuit (ASIC), a digital signal processor, a microprocessor, or another type of processor. The instructions may comprise firmware 126 or software 130 stored in one or more memories 124. Memories 124 may comprise volatile and/or non-volatile memories, write-protected memories, write-once memories, RAM, ROM, and other memory and data storage types and devices.

The instructions stored in firmware 126 and/or as software 130 in memory 124 are executed according configuration settings stored in memory 124. Configuration settings 128 configure operation of scanner 108, and various components, both hardware and software, therein. For example, configuration settings 108 may operate to configure the volume of speaker 112, display lighting 116 operation, brightness of scan field lighting 120, selection of a decoding algorithm for scanning device(s) 118, and the selection of one or more communication protocols used to communicate data from scanner 108 to POS system 104, via a wired or wireless communication interface 106 of POS system 104 to a physical communication interface device 114 or virtualized communication interface 132 of scanner 108. For example, in some embodiments, communication interface 106 of POS system 104 is accessible from scanner 108 as a virtualized communication interface 132 maintained in memory 124 by a process that executes on processor 122. Each of communication interfaces 106, 114 may comprise wired or wireless communication interface devices, such as a wired Ethernet device, a wireless Ethernet device (e.g., a device capable of communicating according to one or more of the 802.11 standards), a Bluetooth® communication device, a mesh network device or other peer-to-peer type networking device, a mobile network data communication device, and the like.

In some embodiments, software 130 stored in memory 124 includes instructions executable on processor 122 to automatically set configuration settings 128, such as upon scanner 108 installation, completion of scanner 108 maintenance, or other times with regard to scanner 108.

In one example embodiment, checkout station 100 may also include an overhead camera connected to scanner 108 directly or through POS system 10. The overhead camera includes its own illumination and a neutral surface, such as a gray or other color that does not distort or add color to captured images, with a matte or other finish that minimizes glare reflecting from the camera. The color spectrum of the illumination is known for calibrating resulting image data.

Figure 2:
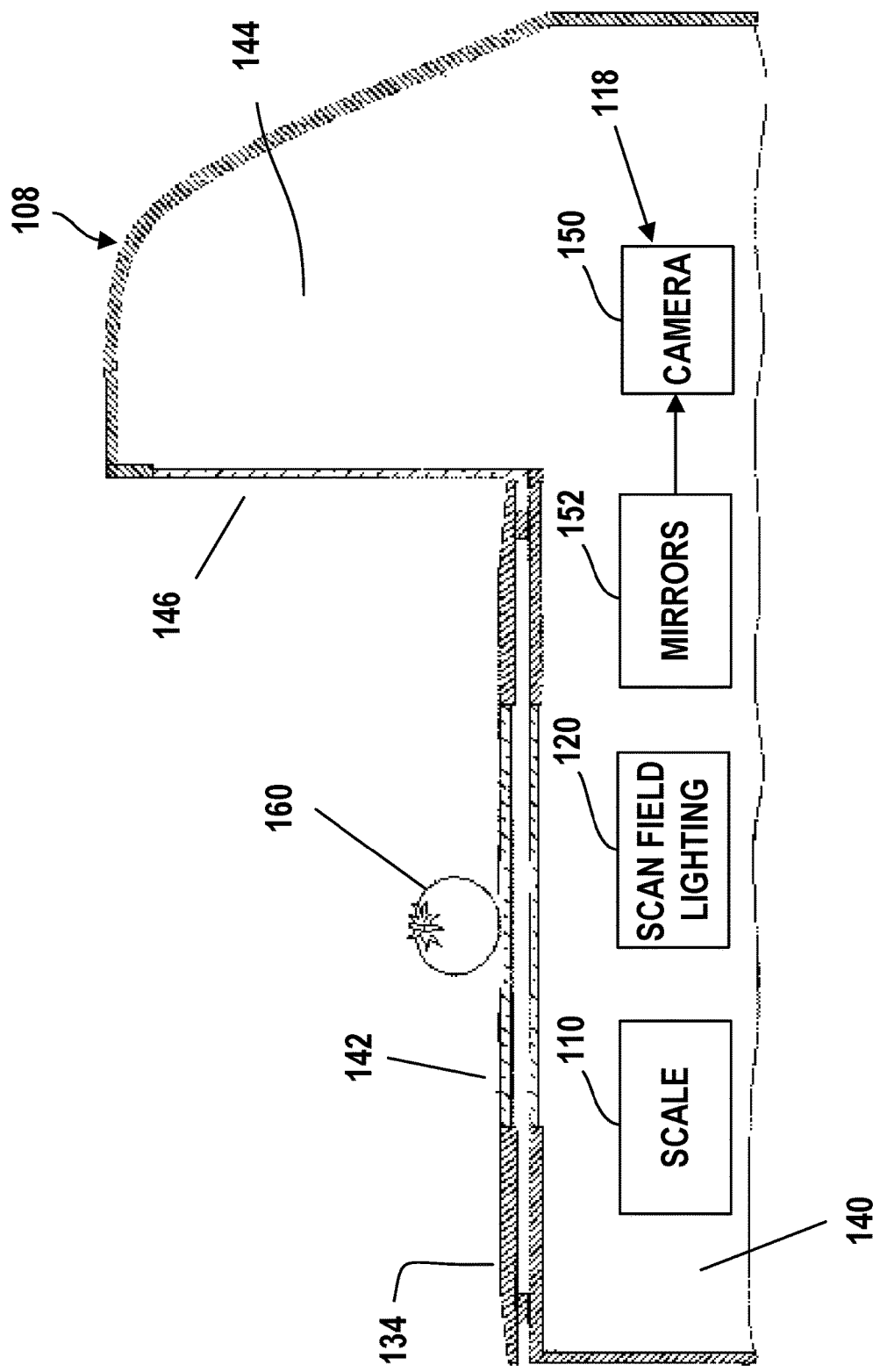
FIG. 2 illustrates a partial cross section of a barcode scanner with scale.

Turning to FIG. 2, there is provided a partial cross section of an example scanner 108. In this example embodiment, scanner 108 includes a horizontal portion 140 with a horizontal aperture 142 and a vertical portion 144 with a vertical aperture 146 for scanning an item from multiple directions.

An example scanning device 118 includes a camera 150. Mirrors 152 direct images of an item to camera 150. Scan field lighting 120 illuminates the item. The example scanner 108 further includes a scale 110. A weigh plate 134 rests upon the scale 110 and a produce item 160 to be purchased sits on the weigh plate 134.

Figure 4:
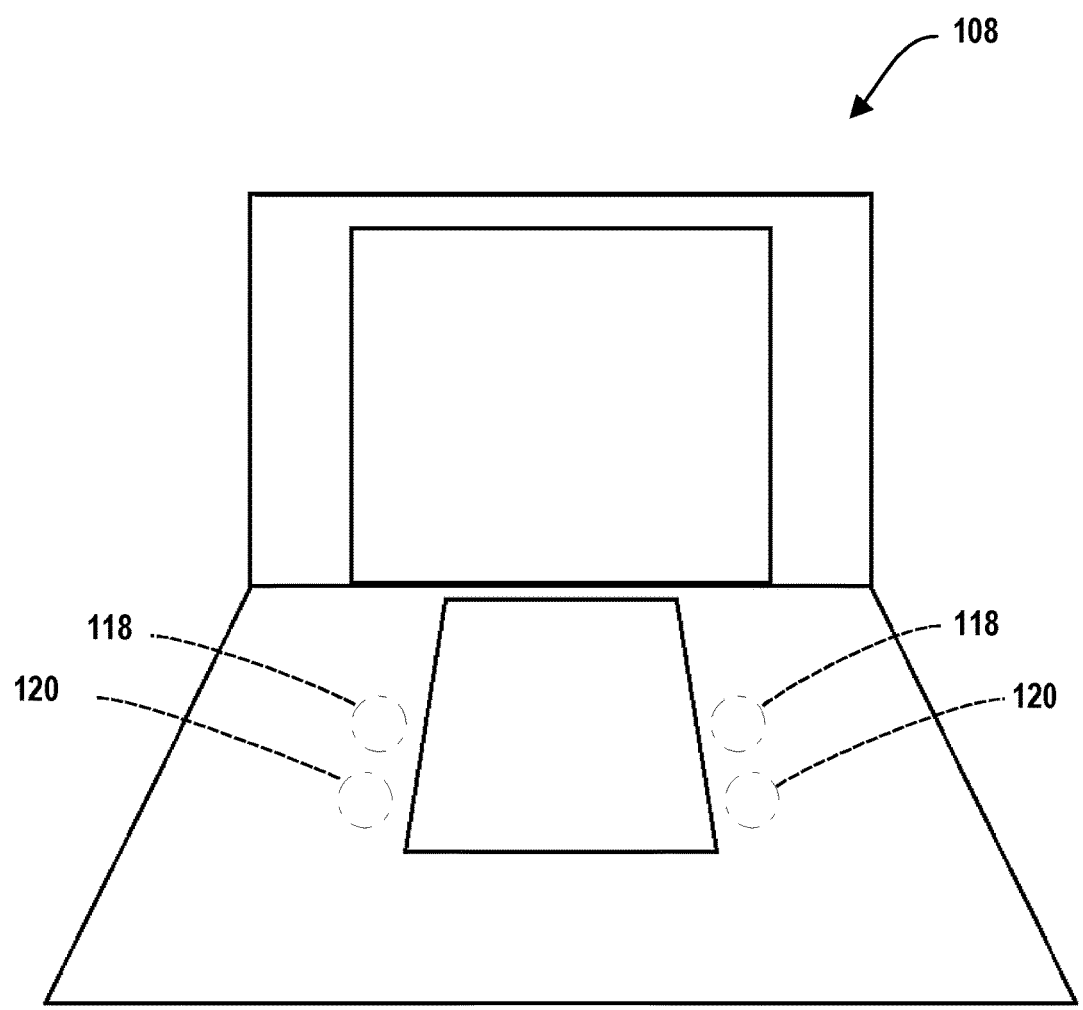
FIG. 4 illustrates an example scanner illustrating an example camera and scan field lighting locations.

In FIG. 4, a first example configuration has scanning device 118 and scan field lighting 120 located under horizontal aperture 142.

In operation, scanner 108 uses camera 150 to capture an image of produce item 160 and sends the image to POS system 104. POS system 104 processes the image to obtain information about the produce item 160 and optimizes the pick list for display by an operator display 102.

In an example embodiment, camera 150 is capable of capturing color images to enhance optimization of the pick list with color information.

In an example embodiment, scan field lighting 120 includes one or more white light emitting diodes (LEDs).

In an example embodiment, mirrors 152 and scan field lighting 120 are arranged to minimize glare. In one example configuration, only one mirror 152 is used in the horizontal portion 140.

Figure 5:
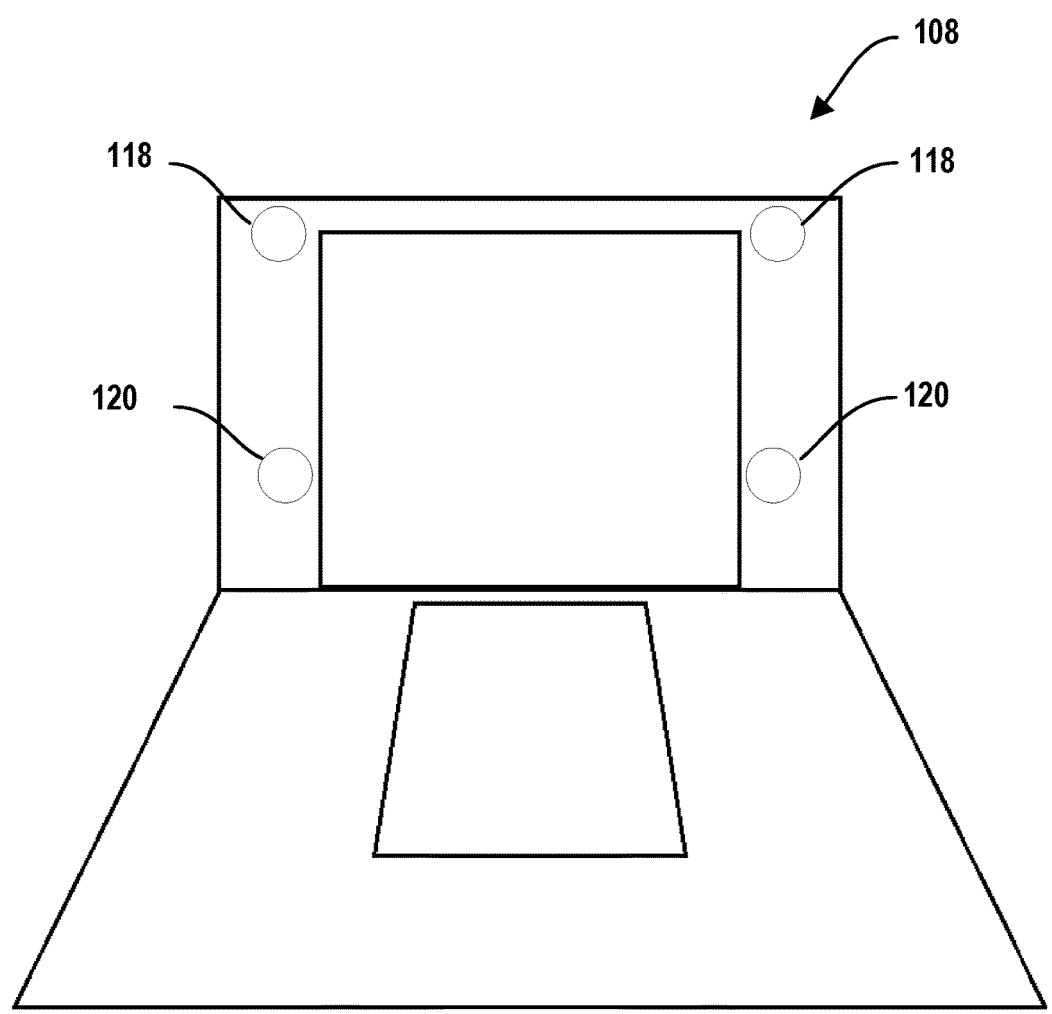
FIG. 5 illustrates an example scanner illustrating an example camera and scan field lighting locations.

In FIG. 5, a second example configuration has scanning device 118 and scan field lighting 120 located on either side of vertical aperture 142. In an example embodiment, the vertical portion 144 also or alternatively includes a camera 150, mirrors 152, and scan field lighting 120.

In an example embodiment, scanner 108 captures an image of produce item 160 automatically when produce items 160 is place on weigh plate 134. Scanner 108 captures the image whether produce items 160 are placed directly on weigh plate 134 or a clear bag containing produce items 160 is placed on weigh plate 134.

In an example embodiment, the scanner 108 processes the image of the produce item 160.

In an example embodiment, a server coupled to the POS system 104 by a network processes the image of the produce item 160.

Figure 3:
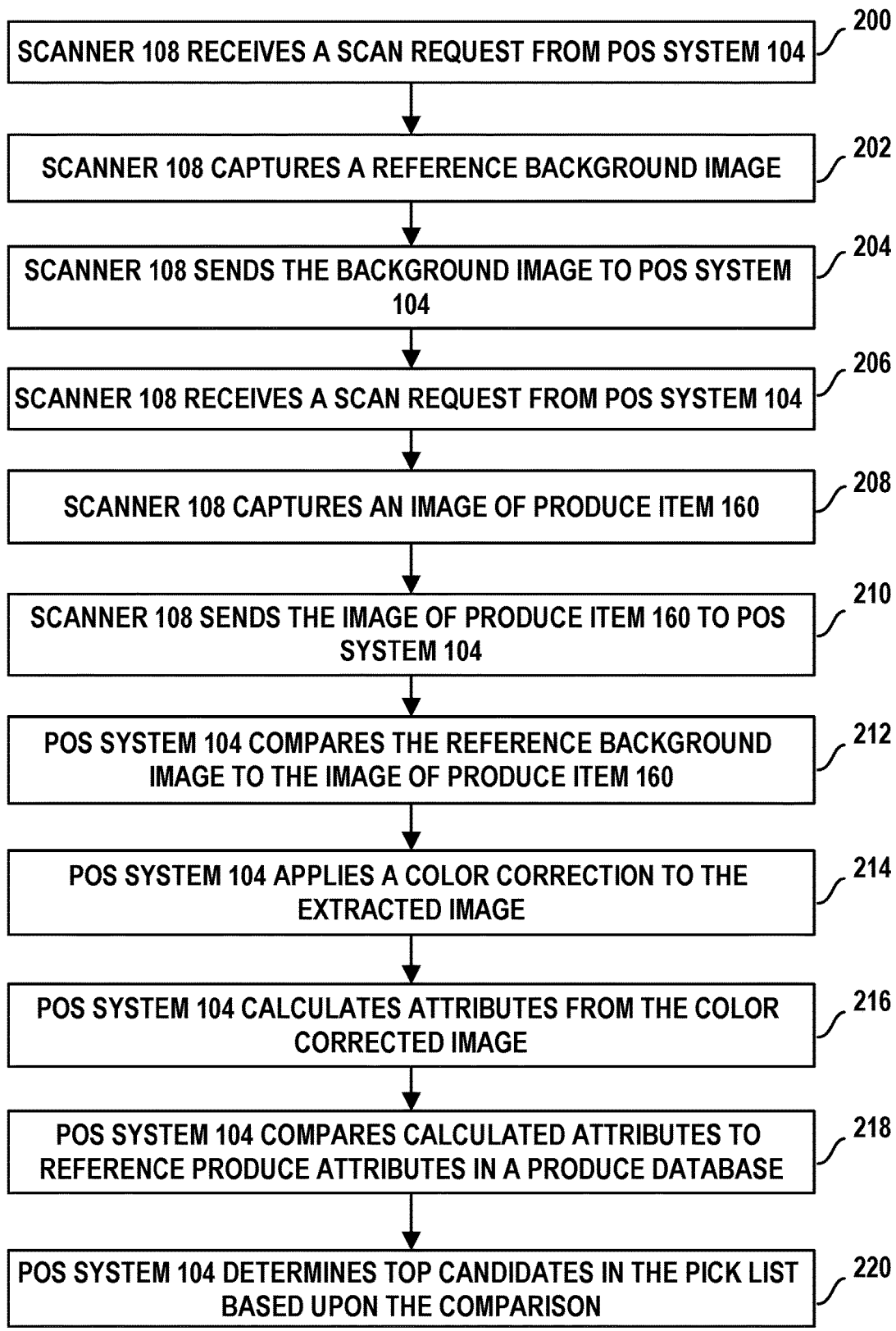
FIG. 3 illustrates an example pick list optimization method.

Turning now to FIG. 3, an example pick list optimization method is illustrated.

In step 200, scanner 108 receives a request from POS system 104 to capture an image. The image will be a reference background image without any items on weigh plate 134.

In step 202, scanner 108 activates scan field lighting 120 and camera 150 to capture the reference background image.

In step 204, scanner 108 sends the background image to POS system 104.

In an example embodiment, steps 200-204 may be accomplished outside of a transaction.

In step 206, scanner 108 receives a request from POS system 104 to capture an image. The image will be an image of produce item 160.

In an example embodiment, scanner 108 may sense the presence of produce item 160 on weigh plate 134 through scale 110 and send a message to POS system 104.

In step 208, scanner 108 activates scan field lighting 120 and camera 150 to capture an image of produce item 160. Scanner 108 controls the level of illumination from scan field lighting to minimize glare while capturing the image.

In step 210, scanner 108 sends the image of produce item 160 to POS system 104.

In an example embodiment, scanner 108 also sends weight information associated with produce item 160.

In step 212, POS system 104 compares the reference background image to the image of produce item 160 to extract a foreground image substantially containing only produce item 160.

In step 214, POS system 104 applies a color correction to the extracted image to enhance its color accuracy and produce a color corrected image.

In an example embodiment, the color correction is in hue, saturation, value (HSV) space.

In step 216, POS system 104 calculates attributes from the color corrected image.

In an example embodiment, the attributes include a color histogram.

In an example embodiment, the attributes include spatial information.

In an example embodiment, the spatial information includes a size estimate.

In an example embodiment, the spatial information includes texture information.

In an example embodiment, the spatial information includes weight information.

In step 218, POS system 104 compares calculated attributes to reference produce attributes in a produce database.

In an example embodiment, the produce database may be located at a server connected to POS system 104 via a network.

In step 220, POS system 104 selects reference produce attributes associated with reference produce items that are closest to the calculated attributes as the top candidates in the pick list.

In an example embodiment, POS system 104 uses a threshold value for the attributes and selects the candidates that meet the threshold value as the most likely or top candidates.

POS system 104 displays the pick list containing the top candidates on POS display 102, for operator selection.

Advantageously, the pick list optimization method may speed up checkout flow and result in more transactions processed for the same amount of operator effort. Optimized pick lists can also be useful at self-service checkout stations. Attendants may find they are spending less time assisting customers. Customers may find transactions go more quickly with less confusion.

Although the present invention has been described with particular reference to certain preferred embodiments thereof, variations and modifications of the present invention can be effected within the spirit and scope of the following claims.

What is claimed is:

1. A pick list optimization method comprising:
    capturing, by a scanner, an image of an item to be purchased when the item is sensed on an weigh plate of the scanner that is integrated into the scanner by directing the image of the item from a horizontal mirror situated beneath the weigh plate to a camera of the scanner and capturing the image by the camera, wherein capturing further includes controlling, by the scanner, a level of illumination from scan field lighting to minimize glare while the camera captures the image;
    calculating, by executable instructions executing on a processor from a non-transitory computer-readable storage medium, attributes from the image;
    comparing, by the executable instructions, calculated attributes to reference item attributes in an item database;
    selecting, by the executable instructions, reference item attributes associated with reference items that are closest to the calculated attributes as top candidates in a pick list; and
    displaying, by the executable instructions, the pick list with the top candidates within a transaction screen for a transaction at a Point-Of-Sale (POS) terminal.

2. The method of claim 1, further comprising:
    extracting, by the executable instructions, a foreground image substantially containing only the item; and
    applying, by the executable instructions, a color correction to the extracted image to enhance its color accuracy and produce a color corrected image;
    wherein calculating includes calculating the attributes from the color corrected image.

3. The method of claim 2, wherein the color correction is in hue, saturation, value (HSV) space.

4. The method of claim 2, wherein the attributes comprise a color histogram.

5. The method of claim 2, wherein the attributes comprise spatial information.

6. The method of claim 5, wherein the spatial information comprises a size estimate.

7. The method of claim 5, wherein the spatial information comprises texture information.

8. The method of claim 1, wherein the item comprises a produce item.

9. A pick list optimization method comprising:
    comparing, by executable instructions executing on a processor from a non-transitory computer-readable storage medium, a reference background image captured by a scanner to an image of a produce item to be purchased when the item is sensed on an weigh plate of the scanner that is integrated into the scanner by directing the image of the produce item from a horizontal mirror situated beneath the weigh plate to a camera of the scanner and capturing the image by the camera, wherein capturing further includes controlling, by the scanner, a level of illumination from scan field lighting to minimize glare while the camera captures the image;
    extracting, by the executable instructions, a foreground image substantially containing only produce item;
    applying, by the executable instructions, a color correction to the extracted image to enhance its color accuracy and produce a color corrected image;
    calculating, by the executable instructions, attributes from the color corrected image;

comparing, by the executable instructions, calculated attributes to reference produce attributes in a produce database;

selecting, by the executable instructions, reference produce attributes associated with reference produce items that are closest to the calculated attributes as top candidates in a pick list;

sending, by the executable instructions, the top candidates to a point of sale (POS) system for display;

displaying, by the POS system, the top candidates in a pick list on a POS display within a transaction screen during a transaction with the POS system.

10. A scanning system comprising:

a scanner;

lighting;

a processor configured to activate the scanner to capture an image of an item when the item is sensed on an weigh plate of the scanner that is integrated into the scanner by directing the image of the item from a horizontal mirror situated beneath the weigh plate to a camera of the scanner and capturing the image by the camera, to activate the lighting during operation of the camera for the scanner, to control a level of the lighting to minimize glare while the image of the item is captured by the camera, to calculate attributes from the image, to compare the attributes to reference item attributes in an item database, select reference item attributes associated with reference items that are closest to the calculated attributes as top candidates in a pick list, and display the pick list within a transaction screen on a Point-Of-Sale (POS) display during a transaction.

11. The system of claim 10, wherein the processor is also configured to extract a foreground image substantially containing only the item, and apply a color correction to the extracted image to enhance its color accuracy and produce a color corrected image, wherein the processor calculates the attributes from the color corrected image.

12. The system of claim 10, further comprising a scale, wherein the processor is also configured to activate the scanner and lighting upon receipt of a signal from the scale indicating placement of the item on the scale.

13. The system of claim 10, further comprising a housing including a substantially horizontal scanning aperture for the scanner, and wherein the camera, the mirror, and lighting are located below the substantially horizontal scanning aperture.

14. The system of claim 10, further comprising a housing including a substantially vertical scanning aperture for the scanner, and wherein the camera, the mirror, and lighting are located adjacent to the substantially vertical scanning aperture.

15. The system of claim 10, further comprising a housing including a substantially horizontal surface for item placement, and wherein the camera and lighting for the scanner are located above the substantially horizontal surface.

16. The system of claim 10, wherein the processor is also configured to send the top candidates to a POS for display on the POS display.

17. The system of claim 10, wherein the lighting comprises white light emitting diodes.

* * * * *